United States Patent [19]

Giorgi

[11] 3,931,431

[45] Jan. 6, 1976

[54] PHOTOGRAPHS COATED WITH A PROTECTIVE AND FINISHING LAYER

[76] Inventor: Lewis A. Giorgi, 286 New Main St., Yonkers, N.Y. 10701

[22] Filed: Apr. 18, 1974

[21] Appl. No.: 461,895

Related U.S. Application Data

[62] Division of Ser. No. 324,583, Jan. 18, 1973, abandoned.

[52] U.S. Cl................. 428/201; 96/50 PL; 427/256; 427/288; 427/368; 428/195; 428/211

[51] Int. Cl.[2] ........................................... B32B 3/30

[58] Field of Search ........ 117/37 R, 45, 76 R, 76 P; 95/1 R; 96/50 PL, 67; 260/32.8 R; 427/260, 261, 258, 256, 288, 368, 407, 411; 428/195, 201, 211

[56] References Cited

UNITED STATES PATENTS

| | | | |
|---|---|---|---|
| 2,013,867 | 9/1935 | Sloan | 96/50 PL X |
| 2,530,738 | 11/1950 | Spessard | 117/64 |
| 2,798,004 | 7/1957 | Weigel | 96/50 PL X |
| 2,830,900 | 4/1958 | Land et al. | 96/50 PL |

FOREIGN PATENTS OR APPLICATIONS

| | | | |
|---|---|---|---|
| 482,204 | 3/1938 | United Kingdom | 96/50 PL |
| 933,391 | 8/1963 | United Kingdom | 96/50 PL |

*Primary Examiner*—Thomas J. Herbert, Jr.
*Assistant Examiner*—Bruce H. Hess

[57] ABSTRACT

Compositions to be applied to professional studio photographs on color paper or black and white emulsions for protective and finishing purposes comprising a vinyl resin in particulate form dispersed in methyl isobutyl ketone to which is added a blend of aromatic hydrocarbons such as naphtha and xylene, with or without a thinning or flattening agent, and a plasticizer. The compositions are also useful for preventing color changes and for making color corrections. They overcome the yellowing and other disadvantages of conventional lacquers such drying hard and cracking the photographic print.

4 Claims, No Drawings

PHOTOGRAPHS COATED WITH A PROTECTIVE AND FINISHING LAYER

This is a division of application Ser. No. 324,583, filed Jan. 18, 1973 now abandoned.

The present invention relates to protective and finishing coating compositions for photographs and more particularly for those colored or black and white relief studio photographs of my copending applications Ser. Nos. 170,433 filed Aug. 10, 1971 and 310,699 filed Nov. 30, 1972. In those applications I have described procedure and materials for producing by wet or dry processes black and white or color studio photographs which have been given a contoured or sculptured nature with a natural life-like appearance whether the subject matter of the photograph be of persons or still life. The details are set forth in the aforesaid copending applications and are incorporated herein by reference.

While it is not always essential to give such contoured studio photographs an outer protective coating, I have referred in those applications to the application of a transparent or colorless lacquer coating which is useful for preservative purposes to retard adverse changes in the finished photographs such as might be due to atmospheric conditions or pollutants in the air. While the use of such a lacquer is generally satisfactory it has known limitations and disadvantages such as yellowing after a period of time and by such color corrections over the tooth-like matte spray has changed color hues. For example, blue changes to green especially with oil colors having linseed oil as its vehicle. The yellowing referred to increases or intensifies the thicker the lacquer build-up. Red changes to orange and brown to beige when faded. The yellowing of lacquer occurs in 6 to 9 months whereas the present vinyl resins remain water clear for years. Vinyls according to the present invention are scratch-resistant to a much greater extent than lacquers, and the vinyl resins when dry retain sufficient elasticity thereby supplying flexibility to a paper or canvased photograph under humidity conditions permitting stretching and shrinking without cracking the print in contrast to lacquers which dry hard and crack the print.

According to the present invention the use of lacquer as a coating is eliminated and is replaced by specially constituted protective and finishing coating compositions which can be varied as to their ingredients or proportions of ingredients to provide a variety of attractive finishes which I herein term brush texture, spray texture, matte and lustre. The brush texture gives the appearance of an oil painting thereby enhancing the appearance of a plane photograph or contoured or sculptured studio photograph whereas the spray texture provides a stippled effect free from the appearance of brush strokes. The matte finish is dull or non-glossy as will be understood from the term itself and the lustre finish gives the appearance of the lacquer coating but without using lacquer. While normally a studio photograph, each of which is made individually, will have only one of the four finishes noted above, it is, nevertheless, a part of the invention to use more than one of such finishes on different parts of the studio photographs or in superimposed combinations over each other to enhance or bring out best the visual appearance of the subject matter of the photograph.

A protective and finishing coating composition according to the present invention comprises a vinyl resin, a special ketone, and an aromatic hydrocarbon, care being taken to avoid the use of benzene, methanol and chlorinated hydrocarbons. Vinyl resins are known both in solution and in dispersion form and while either may be here employed, vinyl dispersions are better and are preferred. These are suspensions of vinyl resins in a non-aqueous liquid which do not dissolve the resins at ambient temperatures. This is advantageous as compared with solutions of high polymer vinyl resins which require relatively large amounts of expensive solvents. The vinyl dispersions are in the liquid phase and the liquid phase may consist of a plasticizer. Such dispersions are often termed plastisols. Where the dispersing liquid contains an organic volatile component the dispersion is an organosol. To some extent these are interchangeable in that a plasticizer dispersion may be converted to an organosol by thinning the plastisol with a volatile liquid. Thus, the present invention employs resins which are polymers of vinyl chloride or copolymers wherein the vinyl chloride is the predominant constituent. Dispersions thereof are prepared by emulsion polymerization to obtain a desired particle size and usually a spherical particle shape which has been found best for good flow properties. Commercial vinyl resins have a particle size of 0.02 to 2 microns in diameter. For organosols the smaller particle sizes are best since they have much less reduced tendency to settle or stratify, but the larger particles are preferred for plastisols because greater fluidity and better viscosity stability are obtained. Where, as is usual, the starting vinyl resins are in the form of agglomerates of individual particles such are milled in order to obtain a smooth dispersion. Plastisol resins capable of dispersion by stirring only are also commercially available.

For preparing a coating composition for the clear and matte phases of the invention the vinyl resin is dissolved in a ketone solvent which is preferably methyl isobutyl ketone. Other ketones can be used as diisobutyl ketone and trimethyl nonanone which are high boiling and have good dispersing power. Ketones which have high solvent power are avoided where they might adversely effect the studio photograph itself and thus strongly solvent and chemically active ketones such as acetone would normally not be employed. In addition to the vinyl resin and ketone, the proportions of which are not critical since the ketone is used in sufficient amount to provide the required fluidity or viscosity, the composition contains a small amount of aromatic hydrocarbons generally considered as diluents for viscosity and fluidity control. They also modify the wetting and swelling characteristics of the dispersing agent used when a vinyl resin dispersion is employed. The aromatic hydrocarbon may be naphtha or a naphthene or xylene such as a mixture of ortho-, meta- and para-xylenes which is readily commercially available. Other aromatic hydrocarbons may be used and these are preferably used in blended form as a diluent. For the matte finishing composition what is known as a flattening compound is incorporated. Such a flattening compound acts to keep the finishing composition level and thin and can be any compatible substance which for example lowers surface tension of the composition such as a non-ionic surfactant of which many are known. The composition may also include a reducer (thinner) which acts to thin the composition by reducing its viscosity in a manner analogous to the use of thinners in paints. The thinner is an aromatic hydrocarbon such as xylene or a naphthenic thinner or a 40:60 mixture thereof. It is to be noted that the above coating compositions contain no benzene and no methanol since these have been found to be disadvantageous both with respect to odor characteristics, solvent power and toxicity. Chlorinated hydrocarbons such as trichloroethane are also avoided since they have too much dissolving power as well as too high a volatility. In general, substances such as the foregoing and others are intentionally avoided where they would have any known disadvantages.

The brush texture finish is applied in short strokes with an artist's paint brush to give the appearance of an oil painting as will be clearly understood. They spray texture finish is obtained by placing the brush texture composition in an aerosol dispenser and spraying the same over the photograph in the form of a fine mist. The matte finish is applied in either manner, but lacks any component which would give a glossy or shiny finish and matte surfaces or finishes are per se well known. The lustre finish is essentially the same as the brush texture, but is applied in the manner in which a lacquer would be used while avoiding the disadvantages of lacquers as above described.

The invention is exemplified by a composition consisting essentially of a vinyl resin in particulate form dispersed in a minimum amount of methyl isobutyl ketone and with a small amount of a blend of aromatic hydrocarbons, e.g. naphtha and xylene, sufficient to dilute the vinyl resin and ketone mixture to bring the same to the desired or required viscosity. The methyl isobutyl ketone while having some dissolving action is primarily a dispersant so that the vinyl resin particles become a dispersion as above described to which the diluent is added in an amount to reduce the viscosity as required. Where necessary, the methyl isobutyl ketone may contain or may be admixed with a plasticizer of per se known nature such as a phthalate like cellulose acetate phthalate to prevent or retard hardening or embrittlement of the finishing coating composition. It is understood also that more than one coat of protective and finishing composition may be applied depending upon the desired results and like the contoured and sculptured photographs of my aforesaid copending applications the finishing may be carried out to provide special effects determined either by the studio photographer or the customer. The invention is intended for use by professional photographers.

What is claimed is:

1. A finishing composition brushed or sprayed onto contoured colored studio photographs to form a colorless transparent protective coating thereon which when dry retains flexiblity and elasticity characteristics independent of time, humidity and atmospheric conditions, said composition being composed essentially of commercial particulate vinyl resin dissolved or dispersed in methyl isobutyl ketone, diisobutyl ketone or trimethyl nonanone containing naphtha, a naphthene or a xylene and free from benzene, methanol, acetone and chlorinated hydrocarbons having solvent action on the colored studio photographs, said vinyl resin being polyvinyl chloride or a vinyl chloride copolymer wherein the vinyl chloride predominates.

2. A coated photograph according to claim 1 wherein the coating is composed of a plurality of superimposed layers.

3. A coated photograph according to claim 1 wherein brush texture, spray texture, matte and lustre coatings are brushed or sprayed on different areas of the photograph to effect visual effects.

4. A coated photograph according to claim 1 wherein the coating prevents fading or color changes in the underlying black and white or color contoured studio photograph.

* * * * *